Nov. 20, 1951 | K. A. LUNDKVIST | 2,575,882

CONNECTING DEVICE AT CROSSBAR SWITCH
FOR SELECTION OF CONNECTING LINKS

Filed June 4, 1948 | 3 Sheets-Sheet 1

INVENTOR
KARL AXEL LUNDKVIST

Leach & Radue
ATTORNEYS

Nov. 20, 1951 K. A. LUNDKVIST 2,575,882

CONNECTING DEVICE AT CROSSBAR SWITCH
FOR SELECTION OF CONNECTING LINKS

Filed June 4, 1948 3 Sheets-Sheet 2

INVENTOR
KARL AXEL LUNDKVIST

Leech & Radue
ATTORNEYS

Nov. 20, 1951

K. A. LUNDKVIST

CONNECTING DEVICE AT CROSSBAR SWITCH FOR SELECTION OF CONNECTING LINKS 2,575,882

Filed June 4, 1948

3 Sheets-Sheet 3

INVENTOR
KARL AXEL LUNDKVIST
Leach & Radue
ATTORNEYS

Patented Nov. 20, 1951

2,575,882

UNITED STATES PATENT OFFICE 2,575,882

CONNECTING DEVICE AT CROSSBAR SWITCH FOR SELECTION OF CONNECTING LINKS

Karl Axel Lundkvist, Stockholm, Sweden, assignor to Telefonaktiebolaget L M Ericsson, Stockholm, Sweden, a company of Sweden Application June 4, 1948, Serial No. 31,076
In Sweden June 13, 1947

3 Claims. (Cl. 179—18)

Figure 1:
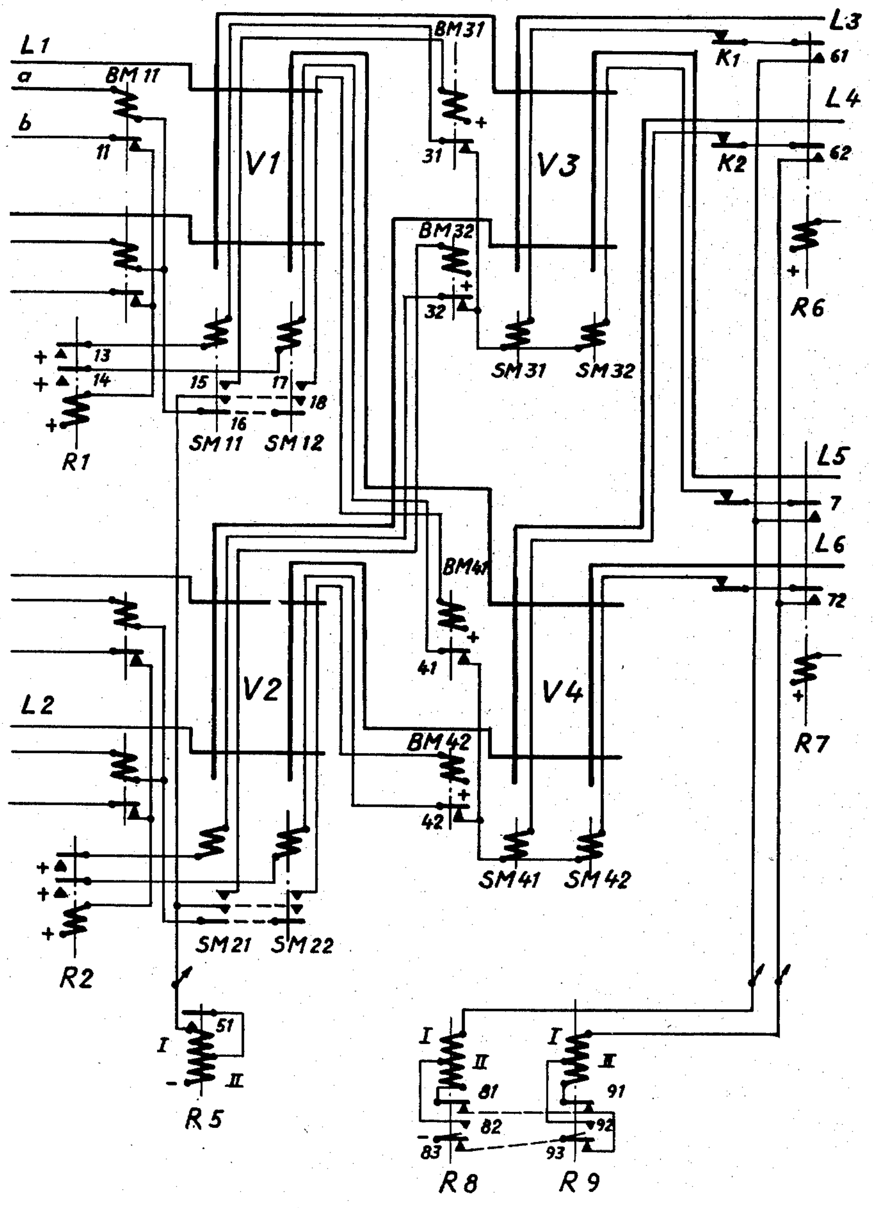

In automatic telephone systems with cross-bar switches, selection stages are used, consisting of a primary and a secondary partial selection stage, and each connection through such a selecting device occupies a primary and a secondary operating bar for cross-bar switches. There are between the primary and the secondary cross-bar switches intermediate connections, so called links, and each link connects an operating bar in a cross-bar switch pertaining to a primary selector to an operating bar or the contact spring sets designated by a selecting magnet, pertaining to a secondary cross-bar switch.

The present invention has for an object to select a free connection through one or more selection stages in a cross-bar system with primary and secondary partial selection stages. Until now, such a selection has usually taken place by means of so called markers, which select a link in each partial selection stage and join them together into a connection. Systems, in which the selection takes place by means of devices in the selectors, are also known. In these, the selecting magnets are first actuated for all the available links in all the partial selection stages through which the connection has to pass, whereafter a link in each partial selection stage is selected. The present invention has for an object to avoid the actuation of an unnecessary number of selecting magnets at selection of free links in a selection stage.

This is achieved in automatic telephone systems with cross-bar switches and markers, in which only one connection at a time can be arranged by means of said markers and the connections are conducted over several operating bars for cross-bar switches connected in series, whereby only one operating bar in each cross-bar switch, through which the connection passes, is required, and in which circuits for selection of idle links are arranged, by connecting together for each cross-bar switch in at least one of the selection stages wires coming from free-indicating contacts, one for each operating magnet within the cross-bar switch and with one wire for each selecting magnet within the same cross-bar switch or with the winding of a relay, which when actuated closes new circuits over said wires arranged one for each selecting magnet, said wires arranged one for each selecting magnet comprising the winding of the selecting magnet and each being at its other end connected to an indicating contact for an operating bar in a cross-bar switch pertaining to a following selection stage or for a line pertaining to an outgoing traffic route. Devices for selection of a free connection are furthermore connected by means of said markers to said circuits and after the selection has taken place said devices increase the voltage in the selected circuit so, that each selecting magnet, the winding of which is comprised in the selected circuit, attracts its armature, and prepares the connection, whereby contacts are closed for actuation of the necessary operating magnets and the necessary contact spring sets are indicated.

The invention will be described more closely with reference to the drawings according to Figs. 1–3.

Fig. 1 shows the application of the invention to a selection stage consisting of primary and secondary cross-bar switches, whereby the selection takes place without auxiliary relays.

Figure 2:
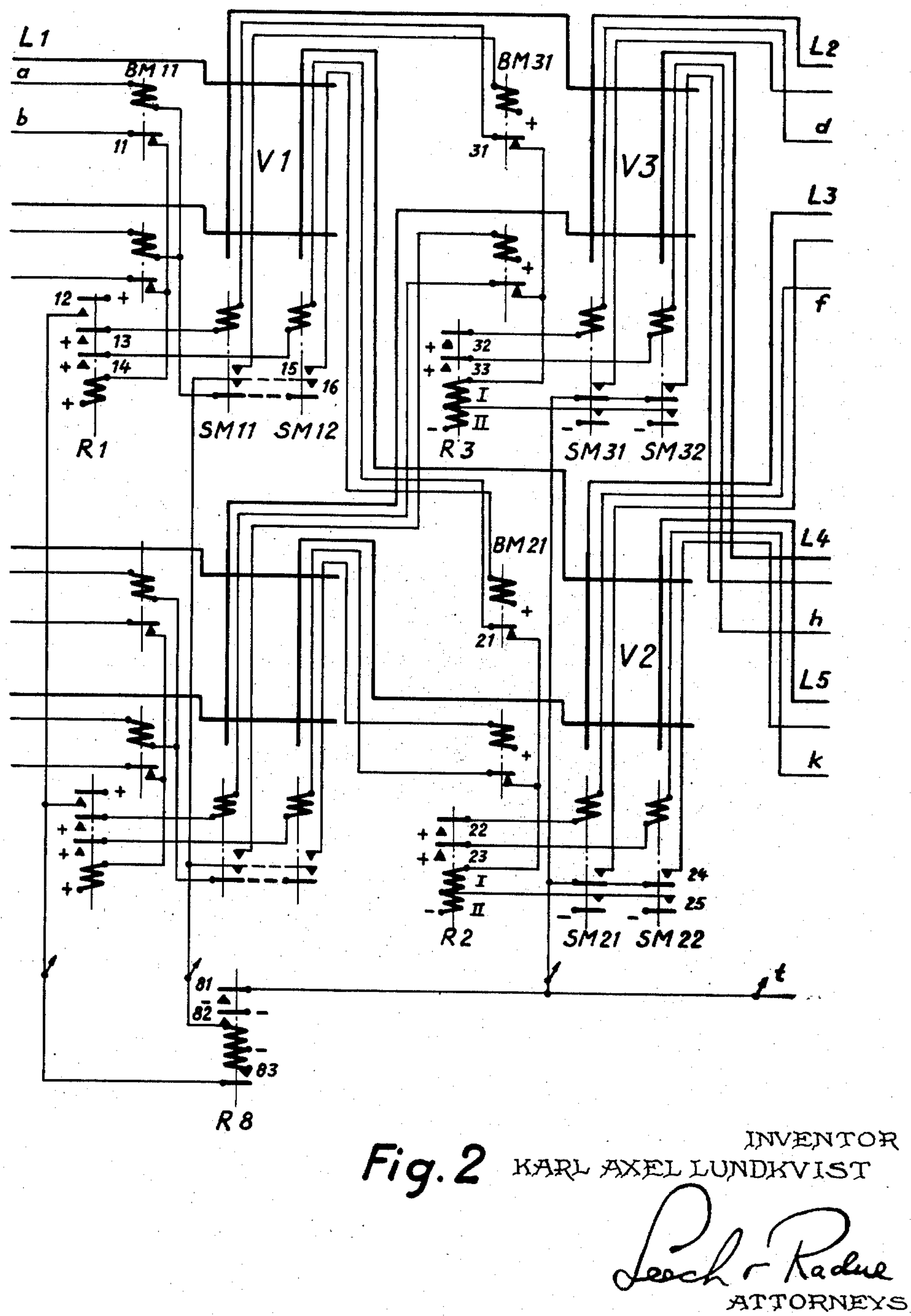
Figure 3:
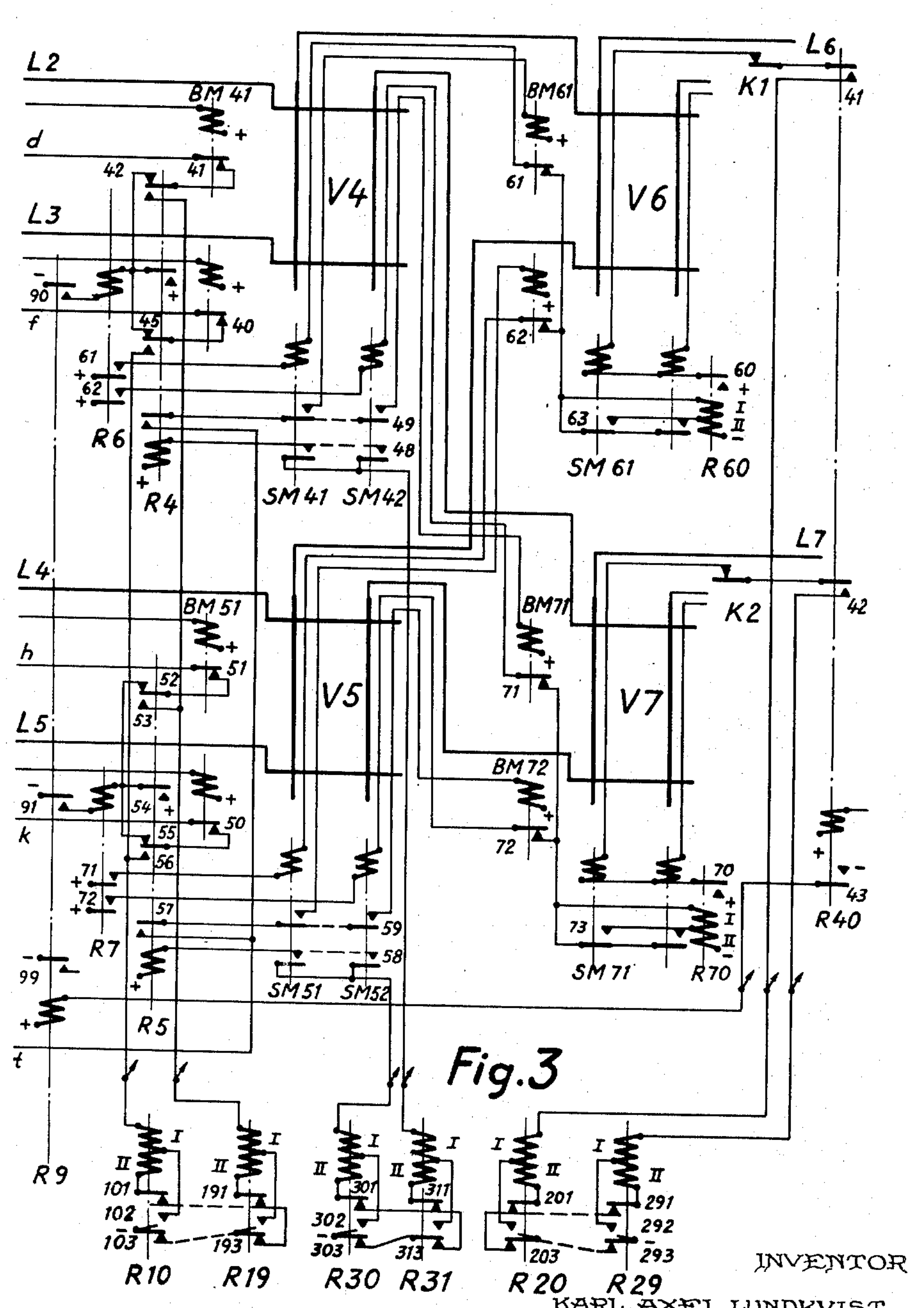

Each one of Figs. 2 and 3 shows one of two selection stages following each other, each free connecting path corresponding to a series of circuits connected together through auxiliary relays. In Fig. 1, V1—V2 are primary cross-bar switches with 10 operating bars each. A line L1 or L2 is connected to each operating bar. V3 and V4 are secondary cross-bar switches also comprising 10 operating bars each. Each secondary operating bar is connected by means of a link with the contact spring sets, which are indicated by a selecting magnet SM11—SM12, or SM21—SM22 respectively, in a primary cross-bar switch. The contact spring sets in a secondary cross-bar switch, which are indicated by the same selecting magnet, SM31—SM32, or SM41—SM42 respectively, are united and connected to outgoing lines L3—L6. A number of outgoing traffic routes are arranged by joining a line from each secondary cross-bar switch to a group of lines. L3 and L4 thus pertain to one traffic route and L5—L6 to another. There is for each outgoing line a contact K1 resp. K2, which is closed, when the line is idle, and broken when the line is busy.

By switching connections through the selecting device in Fig. 1, the intended traffic route and the calling line are indicated by means of a marker and only one connection at a time can be set up. If the traffic route L3—L4 is intended, relay R6 is operated and if the traffic route L5—L6 is intended, relay R7 is operated from the marker. We suppose here that line L1 is calling and is to be connected to one of the lines L3—L4. The line L1 is then connected to the marker over devices which are not shown on Fig. 1 and are unimportant for the invention.

The wires *a* and *b* are individual for line 1 and are indicated *a* by + and *b* by negative, when the line is connected to the marker. Relay R6 receives current from the marker and attracts its armature. Contacts 61—62 are closed. Relay R1 receives current over contact 11 and attracts its armature. Contacts 13—14 are closed.

The following circuits are closed:

*a*. +, contact 13, winding on selecting magnet SM11, contact 31, winding on selecting magnet SM31, contact K1, contact 61, the windings I and II on relay R8, contacts 81, 93 and 83 to negative.

*b*. +, contact 14, winding on selecting magnet SM12, contact 41, winding on selecting magnet SM41, contact K2, contact 62, the windings I and II on relay R9, contacts 91, 93, and 83 to negative.

Winding II on relays R8 and R9 has a high resistance, so that the selecting magnets SM11 and SM31, or SM12 and SM41 respectively, are not operated in said circuits. Relay R8 attracts its armature. Contacts 81—83 are operated. The circuit for relay R9 is broken by contact 83. Winding II on relay R8 is short-circuited and the circuit according to *a* above is conducted over contact 82 to negative. Winding I on relays R8—R9 has a low resistance, due to which the selecting magnets SM11 and SM31 now attract their armatures. Contacts 15—16 are closed and the contact spring sets in the cross-bar switches V1 and V3 corresponding to the selecting magnets SM11 and SM31 are indicated.

The following circuits are closed:

*a*. +, wire *a*, winding on operating bar BM11, contact 16, the windings I and II on relay R5 to negative.

*b*. +, winding on operating bar BM31, contact 15, the windings I and II on relay R5 to negative.

Winding I on relay R5 has a high resistance, due to which magnets BM11 and BM31 are not actuated in said circuits. Relay R5 attracts its armature. Contact 51 short-circuits winding I on relay R5. During the make-period for relay R5, the indicating wires on the selecting bars corresponding to the selecting magnets SM11 and SM31 have time to be set in position.

Winding II on relay R5 has a low resistance, due to which magnets BM11 and BM31 attract their armatures and are self-bound in circuits, which are not shown on the figure and which are unimportant for the invention. Said circuits also entail short-circuiting of line L1 from the marker. Relay R6 releases its armature. Contacts 11 and 31 have been actuated by the operating magnets BM11 or BM31 respectively, whereby the corresponding operating bars in the cross-bar switches V1 and V3 are marked busy. The selecting magnets SM11 and SM31 release their armatures. A connection has now been set up between lines L1 and L3 over the contact spring sets, which have been indicated by selecting magnets SM11 and SM31 and which are operated by operating magnets BM11 and BM31 respectively. When line L3 is actuated, contact K1 is broken.

Since only one of the lines L1—L2 at a time can be connected to the marker and only one of the lines L3—L4 or L5—L6 respectively comes from each secondary cross-bar switch V3, V4, all the contacts 31—32 for the operating magnets BM31—BM32 pertaining to the same cross-bar switch V3 are interconnected and connected with the lines on the selecting magnets SM31—SM32.

In Figs. 2-3 another embodiment of the invention is shown as well as two switching positions, of which the first V1—V3 carries out a first group selection and the last, V4—V7, another group selection. Between the two switching positions, there are 20 intermediate lines L2—L5 distributed in two cross-bar switches V4—V5 in the other switching position. A line L1 in Fig. 2 is to be connected by a call with one of the lines L6—L7 in Fig. 3. The lines L6—L7 pertain to a traffic route outgoing from the selectors V6—V7, which route is indicated by a marker through actuation of relay R40, whereby contacts 41—43 are closed. Contact 43 closes a circuit for relay R9, which is common to all the traffic routes outgoing from the selection stage shown in Fig. 3. Relay R9 attracts its armature. Contacts 90—99 are closed, whereby the switching position V4—V7 is prepared to receive a call. Simultaneously, it is supposed that line L1 in Fig. 2 is connected to the marker over circuits not shown on the drawings. + is hereby connected to wire *a* and negative to wire *b*. Relay R1 receives current over contact 11 and attracts its armature. Contacts 12—14 are closed. The following circuits are closed.

*a*. +, contact 13, winding on selecting magnet SM11, contact 31, the windings on relay R3 to negative.

*b*. +, contact 14, winding on selecting magnet SM12, contact 21, the windings on relay R2 to negative.

Relays R2 and R3 attract their armatures. Winding II on relays R2 and R3 has a high resistance, due to what selecting magnets SM11 and SM12 are not actuated. Contacts 32—33 and 22—23 are closed. The following circuits are closed:

*a*. +, contact 32, winding on selecting magnet SM31, wire *d*, contacts 41 and 42, winding on relay R6, contact 90 to negative.

*b*. +, contact 33, winding on selecting magnet SM32, wire *h*, contacts 51 and 52, winding on relay R7, contact 91 to negative.

*c*. +, contact 22, winding on selecting magnet SM21, wire *f*, contacts 40 and 45, winding on relay R6, contact 90 to negative.

*d*. +, contact 23, winding on selecting magnet SM22, wire *k*, contacts 50 and 55, winding on relay R7, contact 91 to negative.

Relays R6 and R7 attract their armatures. Contacts 61—62 and 71—72 are closed.

Relays R6 and R7 have a high resistance, due to what none of the selecting magnets SM21—SM22 or SM31—SM32 are operated. The following further circuits are closed:

*a*. + from contacts 61 or 71 respectively, winding on the selecting magnets SM41 or SM51 respectively, contact 61 or 62 respectively, the windings I and II on relay R60 to negative.

*b*. + from contacts 62 or 72 respectively, winding on selecting magnet SM42 or SM52 respectively, contact 71 or 72 respectively, the windings I and II on relay R70 to negative.

Relays R60 and R70 attract their armatures. Contacts 60 and 70 are closed. Winding I on relays R60 and R70 has a high resistance, owing to what the selecting magnets SM41—SM42 and SM51—SM52 are not actuated. The following circuits complete the indication of a free connection:

+, contact 60 or 70 respectively, winding on selecting magnet SM61 or SM71 respectively, contacts K1 or K2 respectively, and 41 or 42 respectively, the windings I and II on relay R20 or R29 respectively, contact 201 or 291 respectively, contacts 203—293, to negative.

Relay R29 attracts its armatures. Contacts 291—293 are actuated. Winding II on relays R20—R29 has a high resistance, so that the selecting magnets SM61—SM71 are not actuated in series with them. Contact 292 short-circuits winding II on relay R29, whereafter selecting magnet SM71 attracts its armature. Contact 73 short circuits winding I on relay R70, whereafter the selecting magnets SM42 and SM52 attract their armatures. Contacts 48—49 and 58—59 are closed. The following circuits are closed: +, winding on relay R4 or R5 respectively, contact 48 or 58 respectively, the windings I and II on relay R1 or R30 respectively, contact 311 or 301 respectively, contacts 313—303, to negative. Winding II on relays R30—R31 has a high resistance, due to what relays R4 and R5 are not actuated. Relay R30 attracts its armature. Contacts 301—303 are actuated. Contact 302 short-circuits winding II on relay R30, whereafter relay R5 attracts its armature. Contacts 52—57 are operated. Relay R7 is controlled by contact 54. The following circuits are closed:

+, contact 33 or 23, respectively, winding on selecting magnet SM32 or SM22, respectively, wire $h$ or $k$, respectively, contacts 51 and 53 or 50 and 56 respectively, the windings I and II on relay R19 or R10, respectively. Winding II on relays R10—R19 has a high resistance, due to what none of the selecting magnets SM32—SM22 are actuated. Relay R10 attracts its armature. Contacts 101—103 are operated. Contact 102 short-circuits winding II on relay R10. Selecting magnet SM22 attracts its armature. Contacts 24—25 are closed. Contact 25 short-circuits winding II on relay R2, whereafter selecting magnet SM12 attracts its armature. Contacts 15—16 are closed. The following circuits are closed: +, wire $a$ and operating magnet BM11 as well as contact 16 or respectively +, operating magnet BM21 and contact 15, a winding with high resistance on relay R8, to negative. Relay R8 attracts its armature. Contacts 81—83 are closed. Relay R8 is self-held over contacts 12 and 83. The operating magnets BM11 and BM21 attract their armatures with current over contact 82, simultaneously with operating magnets BM51 and BM72 attracting their armatures with current from contact 81 over contact 24 or contacts 57 and 59 respectively. The operating magnets BM11, BM21, BM51 and BM72 are self-held over circuits, which are not shown on the drawings, whereafter the marker is released and relays R1—R3, R5—R8 and R40, R10, R20 and R30 release their armatures. A connection has thus been set up between line L1 and line L7. When line L7 is occupied, contact K2 is opened through means which are unimportant for the invention and not shown on the drawings.

I claim:

1. In an automatic telephone system, a selection stage composed of two groups of cross-bar switches having operating bars, selecting magnets and contact sets; lines, some of said lines being calling lines and connected each to the contacts of one operating bar in the cross-bar switches belonging to one of said groups and some of said lines being called lines and connected each to a row of contact sets corresponding to a selecting magnet in the other group of cross-bar switches, links, each of said links interconnecting the contacts of an operating bar in the last mentioned group of cross-bar switches with a row of contact sets corresponding to a selecting magnet in the previously mentioned group of cross-bar switches, one operating magnet for each of said operating bars, only one of said links being arranged between each cross-bar switch in anyone of said groups and each cross-bar switch in the other one of said groups, a test-conductor for each of said links containing a winding on said selecting magnet pertaining to the link and a break-contact operated by said operating magnet for the operating bar pertaining to the link, said break contact being closed when the link is idle, a number of test relays, means connecting said relays to block each other so that only one test relay at a time can stay operated, means connecting one end of all test conductors for links pertaining to one of said cross-bar switches to one pole of a battery and the other end of each of said test conductors over a winding on one of said test relays to the other pole of said battery, one of said test relays which has been connected to an idle link and the said selecting magnet pertaining to said link being energized and marking said idle link for connection of a calling line connected by said cross-bar switch to a called line selectable by said link, and a make-contact actuated by said selecting magnet closing a circuit for said operating magnet belonging to the operating bar pertaining to the link.

2. In an automatic telephone system, a selection stage composed of primary and secondary cross-bar switches having operating bars, selecting magnets and contact sets; incoming lines connected each to the contacts of one operating bar in one of said primary cross-bar switches, outgoing lines connected each to a row of contact sets corresponding to a selecting magnet in one of said secondary cross-bar switches, links, each of said links interconnecting the contacts of an operating bar in one of said secondary cross-bar switches with a row of contact sets corresponding to a selecting magnet in said primary cross-bar switches, one operating magnet for each of said operating bars, only one of said links being arranged from each primary cross-bar switch to each secondary cross-bar switch, a make-contact on each of said selecting magnets arranged to be closed by said magnet, a test-conductor for each of said links containing a winding on a selecting magnet of a primary switch and a break-contact operated by said operating magnet for said operating bar pertaining to the link, said break contact being closed when the line is idle, a test-conductor for each outgoing line containing a winding on the selecting magnet for the row of contact sets connected to the outgoing line, all said test conductors for links and all said test conductors for outgoing lines meeting in the same secondary cross-bar switch being connected together, a number of test relays, means connecting said relays to block each other so that only one test relay at a time can stay operated, means for connecting all said test conductors for the links pertaining to one of said primary cross-bar switches to one pole of a battery actuated by a call on an incoming line belonging to said primary cross-bar switch, means for connecting said test-conductors for the outgoing lines belonging to a called group of outgoing lines each over the winding on one of said test relays to the other pole of said battery, one of said test-relays which has been connected to the test-conductor for an idle outgoing line that is connected in series with the test conductor for an idle link, and the selecting magnets passed by said two test conductors being thus energized, and the make-contact actuated by said selecting magnet in the test-conductor for the link closing a circuit for said operating magnet of the operating bar pertaining to the said link.

3. In an automatic telephone system, a selection stage composed of primary and secondary cross-bar switches having operating bars, selecting magnets and contact sets; incoming lines connected each to the contact bars of one operating bar in one of said primary cross-bar switches, outgoing lines connected each to a row of contact sets corresponding to a selecting magnet in one of said secondary cross-bar switches, links, each of said links interconnecting the contacts of an operating bar in one of said secondary cross-bar switches with a row of contact-sets corresponding to a selecting magnet in said primary cross-bar switches, one operating magnet for each of said operating bars, only one of said links being arranged from each primary cross-bar switch to each secondary cross-bar switch, a make-contact on each of said selecting magnets arranged to be closed by said magnet, a test-conductor for each of said links including a winding on said selecting magnet and a break-contact operated by said operating magnet for the operating bar pertaining to the link, said break contact being closed when the link is idle, a test-conductor for each outgoing line containing a winding on the selecting magnet for the row of contact sets connected to the outgoing line, a dual winding relay for each secondary cross-bar switch, all said test conductors for links belonging to the same secondary cross-bar switch being connected together and over a winding with high resistance on said relay to one pole of a battery, means for connecting all said test conductors for links pertaining to the same primary cross-bar switch to the other pole of said battery actuated by a call on an incoming line connected to the contacts of an operating bar in said primary cross-bar switch, make-contacts on each of said relays arranged to be closed by the relays, each of said test conductors for outgoing lines belonging to the same secondary cross-bar switch being connected over said make-contacts on the said relay to one pole of said battery, a number of test-relays, means connecting said relays to block each other so that only one test-relay at a time can stay operated, means connecting said test-conductors for the outgoing lines belonging to a called group of outgoing lines each over the winding on one of said test-relays to the other pole of said battery, one of said test-relays which is connected to the test-conductor for an idle line belonging to a secondary cross-bar switch wherein said relay is energized and the selecting magnet arranged in the said test-conductor thus energized, said make-contact on said selecting magnet short-circuiting said winding with high resistance on said relay and energizing the said selecting magnet for the link joining the primary cross-bar switch, in which the calling incoming line appears, and also the secondary cross-bar switch for the selected outgoing line, said make-contact on the last-mentioned selecting magnet closing a circuit for the said operating magnet for the operating bar belonging to the link.

KARL AXEL LUNDKVIST.

No references cited.